United States Patent
Stevens et al.

(10) Patent No.: US 9,920,172 B2
(45) Date of Patent: Mar. 20, 2018

(54) METHOD FOR PROCESSING POLYETHYLENE

(75) Inventors: Peter Stevens, Mortsel (BE); Franky Fant, Wetteren (BE); Daan Dewachter, Mechelen (BE); Alain Brusselle, Wilrijk (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 0 days.

(21) Appl. No.: 14/373,705

(22) PCT Filed: Jan. 24, 2012

(86) PCT No.: PCT/EP2012/051043
§ 371 (c)(1),
(2), (4) Date: Jul. 22, 2014

(87) PCT Pub. No.: WO2013/110322
PCT Pub. Date: Aug. 1, 2013

(65) Prior Publication Data
US 2015/0011696 A1    Jan. 8, 2015

(51) Int. Cl.
*C08J 3/20* (2006.01)
*B29B 9/06* (2006.01)
*B29C 47/00* (2006.01)
*C08J 3/00* (2006.01)

(52) U.S. Cl.
CPC ............... *C08J 3/203* (2013.01); *B29B 9/06* (2013.01); *B29C 47/0004* (2013.01); *B29C 47/0011* (2013.01); *B29C 47/0066* (2013.01); *C08J 3/00* (2013.01); *C08J 2323/06* (2013.01); *C08J 2423/06* (2013.01)

(58) Field of Classification Search
CPC ..... B07B 1/00; B29B 7/30; B29B 9/06; B01J 8/08; B29C 47/004; B29C 47/0011; B29C 47/0066; C08J 3/00; C08J 3/203; C08J 2323/06
USPC .......... 241/9, 10, 24.1, 24.28; 209/240, 241, 209/242
See application file for complete search history.

(56) References Cited

U.S. PATENT DOCUMENTS

| | | | | |
|---|---|---|---|---|
| 4,587,303 A | * | 5/1986 | Turtle | C08L 23/0815 524/528 |
| 5,184,730 A | * | 2/1993 | Paul | 209/142 |
| 5,714,547 A | * | 2/1998 | Li et al. | 525/240 |
| 6,864,207 B2 | | 3/2005 | Knoeppel et al. | |
| 6,930,071 B2 | | 8/2005 | Knoeppel et al. | |
| 2005/0272891 A1 | | 12/2005 | Fouarge et al. | |
| 2012/0087874 A1 | * | 4/2012 | Lakkis et al. | A23G 3/36 424/48 |
| 2012/0108537 A1 | * | 5/2012 | Bourdon | A61K 8/042 514/54 |
| 2012/0108865 A1 | * | 5/2012 | Wegerer et al. | C01B 3/16 585/254 |
| 2012/0117908 A1 | * | 5/2012 | Turek et al. | E04D 1/20 52/519 |
| 2012/0150309 A1 | * | 6/2012 | Marissen | A61F 2/4241 623/21.15 |
| 2015/0366701 A1 | * | 12/2015 | Zhou et al. | A61F 5/566 128/848 |
| 2016/0017134 A1 | * | 1/2016 | Desille | B29C 45/0001 523/467 |
| 2016/0194464 A1 | * | 7/2016 | Demirors et al. | C07F 7/184 525/240 |

FOREIGN PATENT DOCUMENTS

| | | |
|---|---|---|
| CN | 1212709 A | 3/1999 |
| JP | 3189333 B2 | 7/2001 |

OTHER PUBLICATIONS

International Search Report issued in PCT/EP2012/051043 dated Mar. 30, 2012 (2 pages).
Office Action issued in Chinese Application No. 201280067967.0, dated Sep. 1, 2015; (10 pages).
Dongling An et al., Control of High Pressure Polyethylene Product Quality and Reduce Substandard Products; Guangzhou Chemical Industry, vol. 39, No. 6; Mar. 23, 2011; pp. 151-153.
Decision to Grant issued in Korean Application No. 2014-7023212, dated Mar. 30, 2016; (3 pages).

* cited by examiner

*Primary Examiner* — Nathan M Nutter
(74) *Attorney, Agent, or Firm* — Albert Shung (57) ABSTRACT

A method can include consecutively batch processing at least two different polyethylene grades in pellet form in a pellet handling unit. A ratio of a melt flow index (MI) of a first polyethylene in pellet form ($MI_f$) to a MI of a later processed polyethylene in pellet form ($MI_l$) can be smaller than 0.30. The method can include processing an intermediate polyethylene grade in pellet form. An amount of intermediate polyethylene grade processed can be at most $1/100^{th}$ of a handling capacity of the pellet handling unit. The intermediate polyethylene grade can have the same MI as the later processed polyethylene in pellet form.

14 Claims, 3 Drawing Sheets

| first polymer \ later polymer | MI = 0.7 | MI = 0.9 | MI = 1.2 | MI = 2.0 | MI = 2.7 | MI = 4 | MI = 8 |
|---|---|---|---|---|---|---|---|
| MI = 0.7 | 1.00 | 0.78 | 0.58 | 0.35 | 0.26 | 0.18 | 0.09 |
| MI = 0.9 | 1.29 | 1.00 | 0.75 | 0.45 | 0.33 | 0.23 | 0.11 |
| MI = 1.2 | 1.71 | 1.33 | 1.00 | 0.60 | 0.44 | 0.30 | 0.15 |
| MI = 2.0 | 2.86 | 2.22 | 1.67 | 1.00 | 0.74 | 0.50 | 0.25 |
| MI = 2.7 | 3.86 | 3.00 | 2.25 | 1.35 | 1.00 | 0.68 | 0.34 |
| MI = 4 | 5.71 | 4.44 | 3.33 | 2.00 | 1.48 | 1.00 | 0.50 |
| MI = 8 | 11.43 | 8.89 | 6.67 | 4.00 | 2.96 | 2.00 | 1.00 |

METHOD FOR PROCESSING POLYETHYLENE

CROSS REFERENCE TO RELATED APPLICATIONS

This application claims the benefit of PCT/EP2012/051043, filed on Jan. 24, 2012.

TECHNICAL FIELD OF THE INVENTION

The present invention relates to a method for consecutive processing of different olefin polymers grades in pellet form. The invention can advantageously be used in chemical manufacturing, specifically in the olefin polymerization, particularly of ethylene (PE).

BACKGROUND OF THE INVENTION

Polyolefins, such as polyethylene (PE), is synthesized by polymerizing olefin, such as ethylene ($CH_2=CH_2$), monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Olefin polymerizations are frequently carried out in a loop reactor using monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash vessel, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. After extrusion, the obtained polymer pellets are further processed in a pellet treatment unit. In this form the resulting compound can then be used for the manufacturing of different objects.

When consecutively treating different polymer pellets in a same pellet treatment unit, adequate cleaning of the unit is required in between the different operations in order to remove any polymer material from previous runs remaining in any elements of the pellet treatment unit. Polymer residues from a first grade can contaminate subsequently produced polymer grades. Cleaning steps can maintain the quality of the subsequently produced polyethylene batch but are demanding in terms of labour, increase production costs and/or lead to longer down-time.

In view of the above, the present inventors have identified a need in the art for an improved process for the consecutive production of different olefin polymers.

SUMMARY OF THE INVENTION

Polymer residues from a first grade can contaminate subsequently produced polymer grades, thus if the second grade is highly different from the first grade, polymer that is off-specification, i.e. not within the specifications of either the first or the second grade, is produced. Surprisingly, the present inventors have found a way to improve the transition from one polymer grade in pellet form to another polymer grade in pellet form, and overcome at least one of the above and other problems of the prior art.

In a first aspect, the present invention relates to a method for consecutively batch processing at least two different polyethylene grades in pellet form in a pellet handling unit, comprising the steps of consecutively batch processing at least two different polyethylene grades in pellet form in a pellet handling unit, wherein the ratio of the melt flow index (MI) of a first polyethylene in pellet form ($MI_f$) to the MI of a later processed polyethylene in pellet form ($MI_l$) is smaller than 0.30, and comprising the step of processing an intermediate polyethylene grade in pellet form, wherein the amount of intermediate polyethylene grade processed is at most $1/100^{th}$ of the handling capacity of the pellet handling unit, and wherein said intermediate polyethylene grade has the same MI than said later processed polyethylene in pellet form. The present invention is particularly useful for reducing the amount of off-specifications polyethylene in pellet form processed in a pellet handling unit.

Therefore, the present invention also relates to a method for reducing the amount of off-specifications polyethylene in pellet form processed in a pellet handling unit, comprising consecutively batch processing at least two different polyethylene grades in pellet form, wherein the ratio of the melt flow index (MI) of a first polyethylene in pellet form ($MI_f$) to the MI of a later processed polyethylene in pellet form ($MI_l$) is smaller than 0.30, and comprising the step of processing an intermediate polyethylene grade in pellet form, wherein the amount of intermediate polyethylene grade processed is at most $1/100^{th}$ of the handling capacity of the pellet handling unit, and wherein said intermediate polyethylene grade has the same MI than said later processed polyethylene in pellet form.

Surprisingly the present inventors have found that the present invention allows no or less cleaning of the pellet handling unit is required. This results in less down-time, increased productivity, improved cost-effectiveness and/or improved end-product. Moreover, the invention may lead to reduced amount of off-specifications polyethylene in pellet form during the consecutive batch processing of polyethylenes of different grades. As a result of a reduced change-over time between consecutively processed polyethylenes, the required quality, within specification, is more quickly obtained.

Mixing or blending of polyethylenes with a narrow molecular weight distribution in general tends to be more troublesome than mixing polyethylenes with a broad molecular weight distribution. Hence, contamination of one polyethylene grade in pellet form with a narrow molecular weight distribution with another polyethylene grade in pellet form with a narrow molecular weight distribution may be more prone to quality loss of the final product. The present invention therefore in particular solves these problems associated with the consecutive processing of polyethylenes grade of with a narrow molecular weight distribution.

Accordingly, in an embodiment, the invention relates to a method or use as described herein, wherein said consecutively processed polyethylenes are produced in the presence of an ethylene polymerization catalyst wherein said catalyst produces polyethylene with a narrow molecular weight distribution. In a preferred embodiment, said consecutively batch processed polyethylene pellets are obtained from polyethylene resins produced in the presence of a metallocene catalyst.

In a further embodiment, the invention relates to a method or use as described herein, wherein said consecutively processed polyethylenes have a monomodal molecular weight distribution.

In a further embodiment, the invention relates to a method or use as described herein, wherein at least two of said different polyethylenes have a different molecular weight distribution.

In this way, consecutive processing of different polyethylene grades in pellet form need not be halted or interrupted for cleaning purposes after processing of a polyethylene pellet with a low melt flow index. Preferably, using from 100 kg to 2 tonnes of the intermediate polyethylene grade per 40 tonnes/hour handling capacity of the pellet handling unit, said intermediate polyethylene grade having the same MI than a later processed polyethylene in pellet form, allows the processing of a later polyethylene with a higher MI subsequently to polymers with a lower MI while avoiding equipment cleaning.

In an embodiment, the invention relates to a method or use as described herein, wherein the pellet handling unit comprises one or more transfer lines, one or more homogenization silos and/or one or more storage silos.

DETAILS OF THE INVENTION

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It is an object of the present invention to provide an improved process for regulating the transition from one polyethylene grade to another polyethylene grade in a polyethylene pellet handling unit.

A "polyethylene grade" as used herein is a polyethylene that falls within a given set of specifications, which define specific properties that the polyethylene must have, for example a melt flow index and a density falling within given ranges. It is to be understood that the present invention relates to the consecutive processing of different polyethylene grade. As used herein, the term "different polyethylene" refers to polyethylenes which have at least one different (i.e. non-identical) physicochemical, mechanical, optical, or otherwise characteristic property. Different polyethylenes can be produced under different reactor conditions. Non-limiting examples of such properties include density, molecular weight, molecular weight distribution, melt flow index, melting point, strength, elongation, modulus, toughness, flexibility, heat resistance, haze, gloss, transparency, clarity, transmittance, etc. Each of these properties or parameters can be routinely determined or measured with techniques known in the art.

In particular, the inventors have unexpectedly found when a first polyethylene in pellet and a later processed polyethylene in pellet form are processed consecutively in the same pellet handling unit and have a ratio of the MI of the first polyethylene to the MI of a later processed polyethylene smaller than 0.30, it is not necessary to clean the equipments between said first polyethylene grade and said later produced one, if an intermediate polyethylene grade in pellet form is processed after said first polyethylene, with said intermediate polyethylene grade having the same MI as the later processed grade, and with said intermediate polyethylene grade being processed in an amount of at most $1/100^{th}$ of the handling capacity of the pellet handling unit. As such, according to the invention, an important improvement in respect of time- and cost-effectiveness of polyethylene processing is realized. Less cleaning leads to a faster processing time, higher throughput and hence a higher production capacity. The method of the invention leads to more optimal production results, lower downstream contamination and smaller off-spec batches between different processing runs.

Accordingly, the invention is directed at optimizing processing run scheduling of large processing batches to avoid down-time and cleaning efforts. In an aspect, the present invention relates a method for consecutively batch processing at least two different polyethylene grades in pellet form in a pellet handling unit, comprising the steps of: (a) processing first polyethylene in pellet form, (b) after step (a) subsequently processing an intermediate polyethylene grade in pellet form, and (c) consecutively processing a further polyethylene in pellet form, wherein the ratio of the melt flow index ($MI_f$) of the first polyethylene to the melt flow index $MI_l$ of the later processed polyethylene of step (c) is smaller than 0.30, wherein the amount of intermediate polyethylene grade processed is at most $1/100^{th}$ of the handling capacity of the pellet handling unit, and, wherein said intermediate polyethylene grade has the same MI than said later processed polyethylene in pellet form.

In an embodiment, said method comprises the step of processing from 100 kg to 2 tonnes (2000 kg) of the intermediate polyethylene grade for handling capacities of up to 40 tonnes/hour.

In an embodiment, said method comprises the step of discarding said processed intermediate polyethylene before processing said later polyethylene.

More preferably the method for consecutively batch processing at least two different polyethylene grades in pellet form in a pellet handling unit, comprises the steps of first processing a first polyethylene grade in pellet form in a pellet handling unit, consecutively processing in the same pellet handling unit 100 kg to 2 tonnes of an intermediate polyethylene grade in pellet form for handling capacities of up to 40 tonnes/hour, and consecutively processing a later polyethylene grade in pellet form in the same pellet handling unit, wherein the ratio of the melt flow index (MI) of a first polyethylene in pellet form ($MI_f$) to the MI of a later processed polyethylene in pellet form ($MI_l$) is smaller than 0.30, and wherein said intermediate polyethylene grade has the same MI than said later processed polyethylene in pellet form.

Preferably from 100 kg to 2 tonnes of the intermediate polyethylene grade are processed for pellet handling units having handling capacity of up to 40 tonnes per hour. For example from 200 kg to 2 tonnes, for example from 500 kg to 2 tonnes, for example from 1 tonne to 2 tonnes of the intermediate polyethylene grade can be processed in pellet handling units having handling capacity of up to 40 tonnes per hour. Said method is particularly useful for transition between polyethylene pellets of different grades, and therefore permit to avoid cleaning between two batch process polyethylene pellets of different grades.

As used herein "cleaning" refers to cleaning of a polyethylene pellet handling unit. Cleaning can be performed by any means known in the art, such as without limitation chemical cleaning or mechanical cleaning. Cleaning may involve flushing or rinsing all units in the polyethylene pellet handling unit with cleaning agents (among which detergents), such as, without limitation high pressure water cleaning.

In an embodiment, the invention also concern a method of transition between polyethylene pellets of different grades comprising the steps of: (a) processing first polyethylene in pellet form, (b) after step (a) subsequently processing an intermediate polyethylene grade in pellet form, and discarding said grade before (c) consecutively processing a further polyethylene in pellet form, wherein the ratio of the melt flow index ($MI_f$) of the first polyethylene to the melt flow index $MI_l$ of the later processed polyethylene of step (c) is smaller than 0.30, wherein the amount of intermediate polyethylene grade processed is at most $1/100^{th}$ of the handling capacity of the pellet handling unit, and, wherein said intermediate polyethylene grade has the same MI than said later processed polyethylene in pellet form.

In an embodiment, the method comprises the steps of: (a) processing first polyethylene in pellet form in a pellet handling unit, (b) after step (a) subsequently processing an intermediate polyethylene grade in pellet form, and discarding said grade before (c) consecutively processing a further polyethylene in pellet form, wherein the ratio of the melt flow index ($MI_f$) of the first polyethylene to the melt flow index $MI_l$ of the later processed polyethylene of step (c) is smaller than 0.30 and said intermediate polyethylene grade has the same MI than said later processed polyethylene, wherein the amount of intermediate polyethylene grade processed is ranging from 100 kg to 2 tonnes for pellet handling units having handling capacity of up to 40 tonnes per hour.

The present invention relates to consecutively processing polyethylenes in pellet form in a pellet handling unit. As used herein, the term "pellet handling unit" relates to the equipment which is used to process, manipulate or treat polyethylene pellets. By means of example and without limitation, processing of polyethylene pellets comprises homogenizing batches of pellets, treating pellets with solids, liquids, gasses, or irradiation, addition of additives, drying pellets, heating or cooling pellets, washing pellets, transporting pellets, or storing pellets. Processing, manipulation or treatment of polyethylene pellets is typically performed to ensure high-grade quality of the end product. As will be understood by a person skilled in the art, a pellet handling unit according to the invention can encompass different types of equipment, depending on the desired end product. In essence, a pellet handling unit comprises all equipment which comes into contact with pellets downstream of an extruder up to packaging the pellets for shipment to a customer. In an embodiment, the pellet handling unit for use in the invention comprises one or more transfer lines, one or more homogenization silos and/or one or more storage silos. In a further embodiment, the pellet handling unit comprises one or more dryers. In a further embodiment, the pellet handling unit comprises means for heating and/or means for cooling pellets. In a further embodiment, the pellet handling unit comprises means for washing pellets and/or means for treating pellets with additives, solids, liquids, gasses and/or irradiation. In another embodiment, the pellet handling unit is a combination of two or more of the embodiments above.

In an embodiment, the amount of intermediate polyethylene grade processed is at most $1/100^{th}$ of the handling capacity of the pellet handling unit. Preferably this amount is about 100 kg to 2 tonnes for pellet handling unit having handling capacities of up to 40 tonnes/hour. This initial amount of intermediate polyethylene effectively removes substantially all rest fraction of the first polyethylene from the pellet handling unit. Accordingly, in an embodiment, the intermediate polyethylene in pellet form is used to clean the pellet handling unit after prior processing of a first polyethylene in pellet form. Depending on the downstream application, said amount of intermediate polyethylene pellets can be set aside and can be either kept separate and separately stored or alternatively combined with either the first or the later polyethylene in pellet form if needed.

According to the invention, the melt flow indexes of the sequentially processed polyethylenes are compared in a ratio. In this context, reference is made to a "first" polyethylene and a "later" polyethylene. The "first" polyethylene is the one which is processed in time prior to the "later" polyethylene. The "first" polymer corresponds to the former or prior polymer, whereas the "later" polymer corresponds to the subsequent polymer. As used herein, "intermediate" polyethylene refers to a polyethylene which is processed right after processing said first polyethylene. According to the invention, at least one intermediate polyethylene is processed between a first and a later polyethylene.

According to the invention, the ratio between the melt flow index of a first polyethylene grade in a pellet form and the melt flow index of a later (i.e. latter or subsequent) polyethylene grade in a pellet form is determined. As used herein, the ratio is defined as the arithmetic division or the quotient of the melt flow index of the first polyethylene ($MI_f$) by the melt flow index of the later polyethylene ($MI_l$) according to the following formula (I):

$$\text{Ratio} = \frac{MI_f}{MI_l} \quad (I)$$

The melt flow index is a measure of the ease of flow of the melt of a thermoplastic polymer. The melt flow index is an indirect measure of molecular weight, high melt flow index corresponding to low molecular weight. It is defined as the mass of polymer in grams flowing in 10 minutes through a capillary of specific diameter and length by a pressure applied via prescribed alternative gravimetric weights for alternative prescribed temperatures. The method is given in ASTM D1238. Synonyms of melt flow index (MFI) are melt flow rate (MFR) and melt index (MI). According to the invention, the melt flow index for polyethylene as used herein is determined according to ASTM D1238, condition E, at a temperature of 190° C. and a load of 2.16 kg.

For the purpose of this invention, "resin" is defined as the polymer material that is produced in the loop reactor with the hard catalyst particle at the core of each grain of the powder and which is also sometimes referred to as "fluff".

For the purpose of the invention, "polyethylene product" or "polyethylene pellet" is defined as ethylene polymer material that is produced through compounding and homogenizing of the resin, for instance with mixing and/or extruding equipment.

Typically, the polyethylene pellets which are processed in the pellet handling unit are produced by extrusion of particulate polyethylene resin. Extrusion is well known in the art and will not be discussed further. By means of further guidance, and without limitation, polyethylene resin extrusion may involve mechanically forcing the polyethylene through an extrusion die to obtain a specified cross-sectional shape (e.g. round), after which pellets of a specified dimension are obtained by cutting the extruded polyethylene. After the pellets are produced, the pellets can be stored or alternatively immediately processed in a pellet handling unit.

In an embodiment, said consecutively processed polyethylenes have a monomodal molecular weight distribution. In another embodiment, at least one polyethylene has a monomodal molecular weight distribution. In a further embodiment, at least two consecutively processed polyethylenes have a monomodal molecular weight distribution. In yet another embodiment, at least three consecutively processed polyethylenes have a monomodal molecular weight distribution.

By the term "monomodal polyethylenes" it is meant, polymers having one maxima in their molecular weight distribution curve. By the term "polymers with a bimodal molecular weight distribution" or "bimodal polymers" it is meant, polymers having two maxima in their molecular weight distribution curves. By the term "polymers with a multimodal molecular weight distribution" or "multimodal" polymers it is meant polymers with at least two, preferably above two maxima in their molecular weight distribution curves.

In an embodiment, the consecutively processed polyethylenes are produced in the presence of a catalyst which yields polyethylenes that have a narrow molecular weight distribution.

Polyethylene polymerizations are frequently carried out using monomer, diluent and catalyst and optionally co-monomers and hydrogen in a loop reactor. The polymerization is usually performed under slurry conditions, wherein the product usually consists of solid particles and is in suspension in a diluent. The slurry contents of the reactor are circulated continuously with a pump to maintain efficient suspension of the polymer solid particles in the liquid diluent. The product is discharged by means of settling legs, which operate on a batch principle to recover the product. Settling in the legs is used to increase the solids concentration of the slurry finally recovered as product slurry. The product is further discharged to a flash tank, through flash lines, where most of the diluent and unreacted monomers are flashed off and recycled. The polymer particles are dried, additives can be added and finally the polymer is extruded and pelletized.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts or polymerization catalysts. In the present invention it is especially applicable to ethylene polymerization catalysts such as metallocene catalysts, chromium catalysts and/or Ziegler-Natta catalysts, and preferably to metallocene catalysts.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclo-pentadienyl, indenyl, fluorenyl or their derivatives. Use of metallocene catalysts in the polymerization of polyethylene has various advantages. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

(Ar)$_2$MQ$_2$          (I); or

R$^1$(Ar)$_2$MQ$_2$          (II)

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a SiR$^2_3$ group wherein R$^2$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;
wherein M is a transition metal M selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and
wherein R$^1$ is a divalent group or moiety bridging the two Ar groups and selected from the group consisting of a C$_1$-C$_{20}$ alkylene, a germanium, a silicon, a siloxane, an alkylphosphine and an amine, and wherein said R$^1$ is optionally substituted with one or more substituents each independently selected from the group consisting of halogen, a hydrosilyl, a SiR$^2_3$ group wherein R$^2$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl) zirconium dichloride (Cp$_2$ZrCl$_2$), bis(cyclopentadienyl) titanium dichloride (Cp$_2$TiCl$_2$), bis(cyclopentadienyl) hafnium dichloride (Cp$_2$HfCl$_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

The metallocene catalysts are preferably provided on a solid support. The support is preferably an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In an embodiment, the catalyst used herein for producing said polyethylene is a supported metallocene-alumoxane catalyst consisting of a metallocene and an alumoxane which are bound on a porous silica support.

In a preferred embodiment, a polymerization catalyst for the production of the polyethylene is a supported metallocene-alumoxane catalyst comprising a metallocene and an alumoxane which are bound on a porous silica support.

In another embodiment of the present invention, said catalyst is a chromium catalyst. The term "chromium catalysts" refers to catalysts obtained by deposition of chromium oxide on a support, e.g. a silica or aluminium support. Illustrative examples of chromium catalysts comprise but are not limited to CrSiO$_2$ or CrAl$_2$O$_3$.

In another embodiment of the present invention, said catalyst is a Ziegler-Natta catalyst. The term "Ziegler-Natta catalyst" or "ZN catalyst" refers to catalysts having a general formula M$^1$X$_v$, wherein M$^1$ is a transition metal compound selected from group IV to VII, wherein X is a halogen, and wherein v is the valence of the metal. Preferably, M$^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to TiCl$_3$, TiCl$_4$. Preferred ZN catalysts according to the invention are described in U.S. Pat. No. 6,930,071 and U.S. Pat. No. 6,864,207, which are incorporated herein by reference.

As used herein, the term "liquid diluent" refers to diluents, preferably in liquid form that is in a liquid state. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. No limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

By the term "polymerization" it is meant feeding to a reactor reactants including monomer (ethylene), a diluent, a catalyst and optionally a co-monomer, an activating agent and a terminating agent such as hydrogen. A homo-polymer or co-polymer results.

The term "co-polymer" refers to a polymer that is made by linking two different types of in the same polymer chain. The term "homo-polymer" refers to a polymer which is made by linking ethylene monomers, in the absence of co-monomers.

The term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

The term "activating agent" refers to materials that can be used in conjunction with a catalyst in order to improve the activity of the catalyst during the polymerization reaction. In the present invention, it particularly refers to an organoaluminium compound, being optionally halogenated, having general formula $AlR^1R^2R^3$ or $AlR^1R^2Y$, wherein $R^1$, $R^2$, $R^3$ is an alkyl having from 1 to 6 carbon atoms and $R^1$, $R^2$, $R^3$ may be the same or different and wherein Y is hydrogen or a halogen as disclosed in U.S. Pat. No. 6,930,071 and U.S. Pat. No. 6,864,207, which are incorporated herein by reference. Preferred activating agents are Tri-Ethyl Aluminium (TEAI), Tri-Iso-Butyl Aluminium (TIBAI), Tri-Methyl Aluminium (TMA), and Methyl-Methyl-Ethyl Aluminium (MMEAI). TEAI is particularly preferred. In an embodiment, the activating agent is added to the loop reactor in an activating agent slurry at a concentration of less than 90% by weight of the activating agent slurry composition, more preferably from 10 to 50% by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

In an embodiment, said consecutively processed polyethylenes are produced in the presence of an ethylene polymerization catalyst comprising a metallocene catalyst. In another embodiment, at least one polyethylene is produced in the presence of an ethylene polymerization catalyst comprising a metallocene catalyst. In a further embodiment, at least two consecutively produced polyethylenes are produced in the presence of an ethylene polymerization catalyst comprising a metallocene catalyst.

Figure 1:
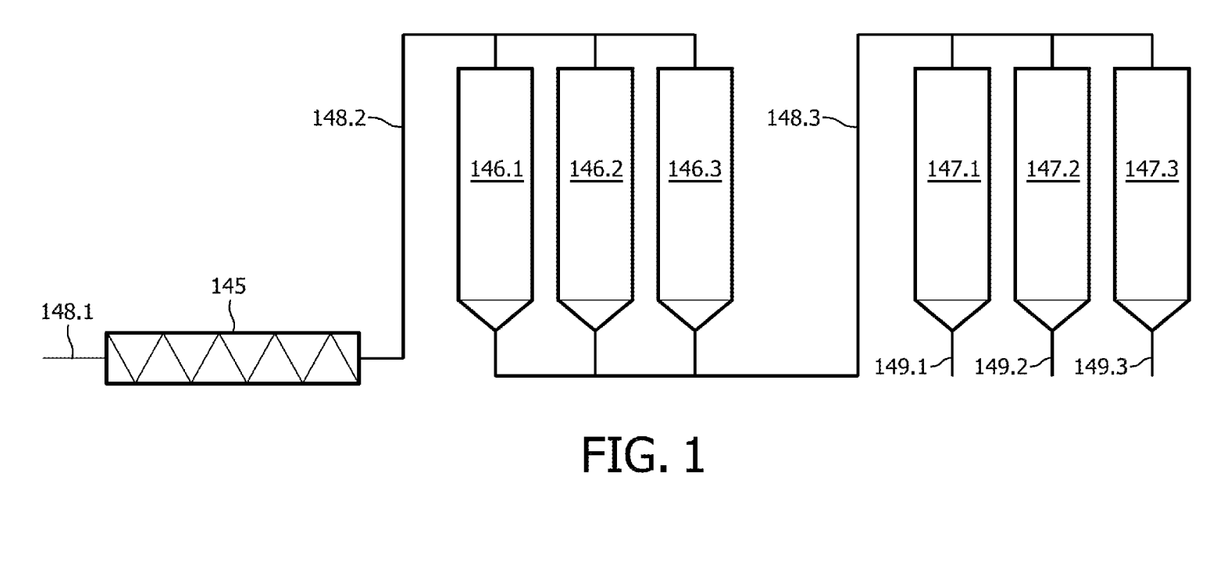
FIG. 1 schematically illustrates an extrusion unit and a pellet handling unit as may be used in an embodiment according to the present invention.

FIG. 1 schematically illustrates an extrusion unit comprising an extruder 145 and a pellet handling unit as may be used in an embodiment according to the present invention. In the embodiment illustrated in FIG. 1, the pellet handling unit comprises one or more transfer lines (148.2, 148.3), one or more homogenization silos (146.1, 146.2, 146.3) and one or more storage silos (147.1, 147.2, 147.3). Through the action of the extruder 145, polyethylene pellets are produced and are processed via a transfer line 148.2 to one or more homogenization silos 146.1, 146.2, 146.3. Depicted in FIG. 1 are three homogenization silos 146.1, 146.2, 146.3, but it will be clear to a person skilled in the art that less or more homogenization silos may be present in the pellet handling unit, e.g. 1 or 2 or alternatively 4, 5, 6 or more. In the one or more homogenization silos 146.1, 146.2, 146.3, pellets are homogenized, after which the pellets are transferred via a transfer line 148.3 to one or more storage silos 147.1, 147.2, 147.3. Depicted in FIG. 1 are three storage silos 147.1, 147.2, 147.3, but it will be clear to a person skilled in the art that less or more storage silos may be present in the pellet handling unit, e.g. 1 or 2 or alternatively 4, 5, 6 or more. Storage silos 147.1, 147.2, 147.3 may be emptied via transfer lines 149.1, 149.2, 149.3. In an embodiment, the method for consecutively batch processing at least two different polyethylene grades in pellet form is performed in the described pellet handling unit. At least two different polyethylene grades in pellet form (a first grade and a later grade) are consecutively batch processed in the pellet handling unit, wherein the ratio of the melt flow index (MI) of the first polyethylene grade ($MI_f$) to the MI of the later processed polyethylene grade ($MI_l$) is smaller than 0.30, and after processing the first polyethylene grade, and prior to processing said later polyethylene grade, an intermediate polyethylene grade having a melt flow index ($MI_i$) is processed, said intermediate polyethylene grade being processed in an amount of at most $\frac{1}{100}^{th}$ of the handling capacity of the pellet handling unit, said intermediate polyethylene grade having the same MI than the later processed polyethylene grade. For example, a first polyethylene resin is produced in a polymerization reactor (not shown) and is transferred from the polymerization reactor (not shown) or alternatively from a polyethylene resin storage unit (not shown) via a transfer line 148.1 to the extruder 145. After extruding said first polyethylene resin, a first polyethylene grade in pellet form with a melt flow index ($MI_f$) is obtained which is further processed in the pellet handing unit. Subsequently, a later polyethylene resin is produced in a polymerization reactor via a transfer line 148.1 to the extruder 145. The later polyethylene grade in pellet form with a melt flow index ($MI_l$) is obtained from the extruder and is further processed in the pellet handing unit, the ratio of the melt flow index (MI) of the first polyethylene grade ($MI_f$) to the MI of the later processed polyethylene grade ($MI_l$) being smaller than 0.30. Prior to processing said later polyethylene grade, an intermediate polyethylene grade having a melt flow index ($MI_i$) is processed, said intermediate polyethylene grade being processed in an amount of at most $\frac{1}{100}^{th}$ of the handling capacity of the pellet handling unit, said intermediate polyethylene grade having the same MI than the later processed polyethylene grade. Surprisingly, by applying the present method, the present inventors have found less cleaning of the pellet handling unit is required, reduced amount of off-specifications polyethylene are produced and better transition between polyethylene pellets of different grades is obtained. As a result of a reduced changeover time between consecutively processed polyethylenes in pellet form, the required quality, within specification, is more quickly obtained.

The invention will now be illustrated by the following non-limiting example.

Example 1

Figure 3:
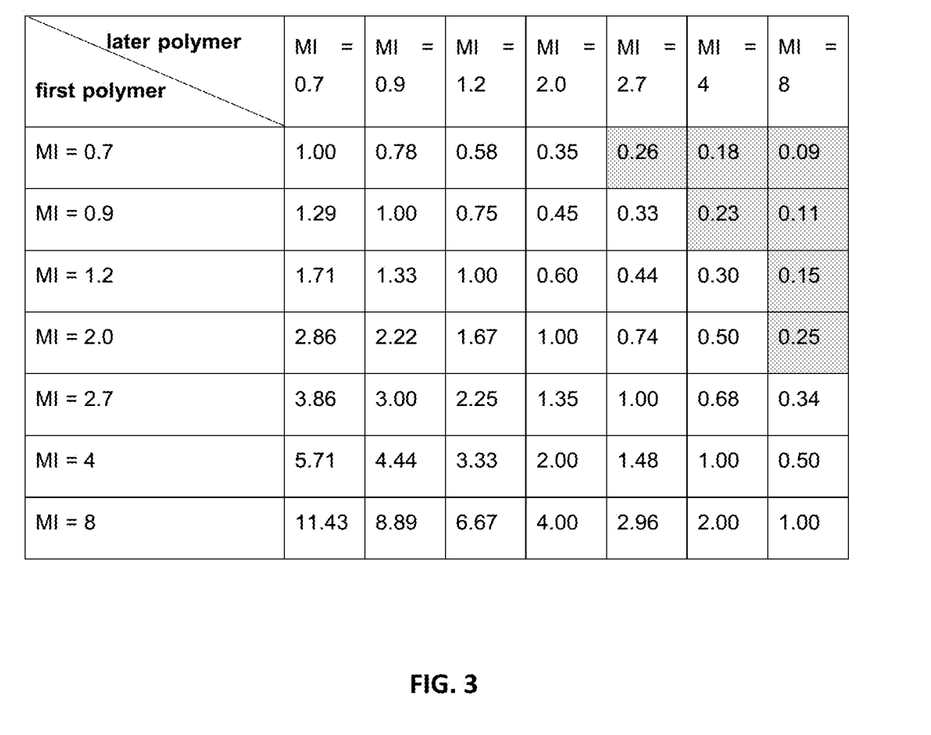
FIG. 3 represents a table showing the ratio of melt flow indexes between consecutively processed polyethylenes in pellet form in a pellet handling unit.

The ratio of the melt flow indexes between consecutively processed polyethylenes in pellet form in a pellet handling unit is shown in FIG. 3. The pellet handling unit had a processing or handling capacity of about 40 tonnes/h. The ratio of the melt flow index (MI) between first process polymer and subsequent later processed polymer was calculated. When the ratio of the melt flow index (MI) of a first polyethylene in pellet form ($MI_f$) to the MI of the later processed polyethylene in pellet form ($MI_l$) was smaller than 0.30 (indicated with grey shaded area in FIG. 3), it was noticed that high amounts of off-spec was produced, and that gel level in film produced from the later processed polyethylene pellets was high, compared to when the MI ratio was above 0.30. The present inventors have 30 found that to avoid or minimize these problems, it was necessary to process about 1 tonne to 2 tonnes of an intermediate polyethylene grade in pellet form having the same MI than the later processed polyethylene in pellet form.

Using about 1 tonne per 40 tonnes/hour capacity on a batch of 300 tonnes allowed less cleaning of the pellet handling unit, reduced amount of off-specifications polyethylene produced and provided better transition between polyethylene pellets of different grades.

Example 2

Different polyethylene grades in pellets form were consecutively batch processed in a pellet handling unit having a handling capacity of 40 tonnes/h. The ratio of the MI of first polyethylene grades (MIf) to the MI of the later processed polyethylene grade (MIl) are shown in Table 1.

TABLE 2

| First PE grade ($MI_f$ g/10 min) | Second PE grade ($MI_l$ g/10 min) | $MI_f/MI_l$ |
|---|---|---|
| PE grade A ($MI_f$ = 0.35) | PE grade K ($MI_l$ = 3.5) | 0.10 |
| PE grade B ($MI_f$ = 0.7) | PE grade H ($MI_l$ = 4) | 0.18 |
| PE grade C ($MI_f$ = 0.9) | PE grade H ($MI_l$ = 4) | 0.22 |
| PE grade D ($MI_f$ = 0.9) | PE grade K ($MI_l$ = 3.5) | 0.26 |
| PE grade E ($MI_f$ = 0.9) | PE grade K ($MI_l$ = 3.5) | 0.26 |
| PE grade F ($MI_f$ = 1.2) | PE grade H ($MI_l$ = 4) | 0.30 |
| PE grade G ($MI_f$ = 0.299) | PE grade E ($MI_l$ = 0.9) | 0.33 |
| PE grade B ($MI_f$ = 0.7) | PE grade C ($MI_l$ = 0.9) | 0.78 |
| PE grade H ($MI_f$ = 4) | PE grade C ($MI_l$ = 0.9) | 4.44 |

Figure 2:
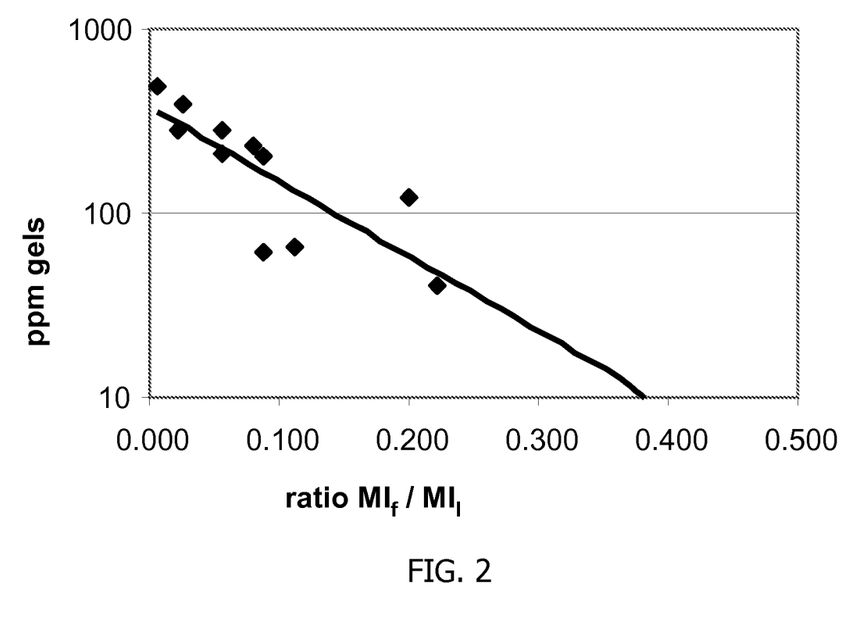
FIG. 2 represents a graphs plotting the amounts of gels (in ppm) measured as a function of the ratio $MI_f/MI_l$ for polyethylene grades in pellets form which were consecutively batch processed in a pellet handling unit, wherein $MI_f$ is the melt index of a first polyethylene grade, and $MI_l$ is the melt index of the later processed polyethylene grade.

Gels level was measured in the later processed polyethylene pellets as ppm as a function of the ratio $MI_f/MI_l$. Polymer pellets were extruded into a film. The gels were counted using an Optical control systems (OCS)® (www.ocsgmbh.com), which comprised an extruder connected to a cast film unit which is connected to a Film Surface Analyzer FSA100 from Optical Control Systems. The results are shown in FIG. 2, where it can be seen that the level of gels increased drastically when the ratio of $MI_f/MI_l$ was below 0.30.

This increase of level of gels in the later processed polyethylene pellets, wherein $MI_f/MI_l$ was below 0.30 was prevented by processing about 200 kg of an intermediate polyethylene grade in pellet form with an MI equal to the $MI_l$, and later discarding this intermediate polyethylene grade, before processing said later polyethylene grade (data not shown).

The present inventors have shown (data not shown) that when the amount of intermediate grade processed was below 100 kg, the amount of off-specification polyethylene and the amount of gel in film produced for the later produced polyethylene increased.

The invention claimed is:

1. A method of consecutively batch processing different polyethylene grades comprising:
   processing a first polyethylene in pellet form in a pellet handling unit comprising one or more transfer lines and one or more homogenization silos downstream of an extruder, wherein processing the first polyethylene in pellet form comprises transferring the pellets of the first polyethylene from the extruder via the one or more transfer lines and homogenizing batches of the pellets of the first polyethylene in the one or more homogenization silos to form homogenized pellets of the first polyethylene;
   after processing the pellets of the first polyethylene, processing a second polyethylene, the second polyethylene a different polyethylene than the first polyethylene, in pellet form in the pellet handling unit downstream of the extruder, wherein processing the second polyethylene in pellet form comprises transferring the pellets of the second polyethylene from the extruder via the one or more transfer lines and homogenizing batches of the pellets of the second polyethylene in the one or more homogenization silos to form homogenized pellets of the second polyethylene; and
   after processing the second polyethylene, processing a later processed polyethylene in pellet form in the pellet handling unit downstream of the extruder, wherein processing the later processed polyethylene in pellet form comprises transferring the pellets of the later processed polyethylene from the extruder via the one or more transfer lines and homogenizing batches of the pellets of the later processed polyethylene in the one or more homogenization silos to form homogenized pellets of the later processed polyethylene;
   wherein a ratio of a melt flow index (MI) of the first polyethylene in pellet form ($MI_f$) to a MI of the later processed polyethylene in pellet form ($MI_l$) is smaller than 0.30, wherein $MI_f$ and $MI_l$ are determined in accordance with ASTM D1238, condition E, at a temperature of 190° C. and a load of 2.16 kg;
   wherein the second polyethylene has the same MI as the later processed polyethylene in pellet form; and
   wherein the first polyethylene, the second polyethylene, and the later processed polyethylene are all processed in the same pellet handling unit.

2. The method according to claim 1, wherein the consecutively batch processed polyethylene pellets are obtained from polyethylene resins produced in the presence of a metallocene catalyst.

3. The method according to claim 1, wherein the processing of each polyethylene in pellet form comprises consecutively transferring the pellets of each polyethylene from the extruder via the one or more transfer lines.

4. The method according to claim 1, wherein at least one of the first polyethylene and the later processed polyethylene has a monomodal molecular weight distribution.

5. The method according to claim 1, wherein the first polyethylene and the later processed polyethylene have monomodal molecular weight distributions.

6. The method according to claim 1, wherein the first polyethylene and the later processed polyethylene have different molecular weight distributions.

7. The method according to claim 1, wherein the pellet handling unit is not cleaned between the processing of the first polyethylene and the later processed polyethylene.

8. The method according to claim 1, wherein the processing of the second polyethylene in pellet form in the pellet handling unit removes substantially all remaining first polyethylene in the pellet handling unit.

9. The method according to claim 1, wherein an amount of the second polyethylene that is processed in the pellet handling unit is at most 0.01 of a handing capacity of the pellet handling unit.

10. The method according to claim 1, wherein from 100 kg to 2000 kg of the second polyethylene is processed in the pellet handling unit per 40 tonnes/hour handling capacity of the pellet handling unit.

11. The method according to claim 1, wherein the pellet handling unit comprises one or more dryers.

12. The method according to claim 1, wherein the pellet handling unit further comprises one or more storage silos, and wherein the processing of each polyethylene in pellet form further comprises consecutively storing the pellets of each polyethylene in the one or more storage silos.

13. The method according to claim 12, wherein the pellet handling unit downstream the processing of each polyethylene in pellet form comprises:

consecutively transferring the pellets of each polyethylene from the extruder to the one or more homogenization silos via the one or more transfer lines;

consecutively homogenizing batches of the pellets of each polyethylene in the one or more homogenization silos to form homogenized pellets of each polyethylene; and consecutively transferring the homogenized pellets of each polyethylene from the one or more homogenization silos to the one or more storage silos via the one or more transfer lines.

14. The method according to claim 1, wherein the processing of each polyethylene in pellet form further comprises consecutively treating the pellets of each polyethylene with solids, liquids, gasses, or irradiation; consecutively adding additives to the pellets of each polyethylene; consecutively drying the pellets of each polyethylene; consecutively heating or cooling the pellets of each polyethylene; or consecutively washing the pellets of each polyethylene.

* * * * *